(12) United States Patent
Laulainen et al.

(10) Patent No.: US 8,189,475 B2
(45) Date of Patent: May 29, 2012

(54) TRANSMISSION OF DIGITAL INFORMATION IN A FRAME SWITCHED DATA NETWORK

(75) Inventors: Mikko Laulainen, Helsinki (FI); Heikki Jekunen, Espoo (FI)

(73) Assignee: Tellabs Oy, Espoo (FI)

( * ) Notice: Subject to any disclaimer, the term of this patent is extended or adjusted under 35 U.S.C. 154(b) by 290 days.

(21) Appl. No.: 11/923,704

(22) Filed: Oct. 25, 2007

(65) Prior Publication Data
US 2008/0273530 A1    Nov. 6, 2008

(30) Foreign Application Priority Data

Oct. 27, 2006   (FI) ...................................... 20060950

(51) Int. Cl.
*H04J 1/16* (2006.01)
(52) U.S. Cl. ........................................ 370/235; 370/476
(58) Field of Classification Search .................. 370/235, 370/471, 475, 476
See application file for complete search history.

(56) References Cited

U.S. PATENT DOCUMENTS

| | | | | |
|---|---|---|---|---|
| 5,650,825 A * | 7/1997 | Naimpally et al. | ........... | 348/465 |
| 6,108,713 A | 8/2000 | Sambamurthy et al. | | |
| 6,282,172 B1 * | 8/2001 | Robles et al. | ................. | 370/230 |
| 7,061,942 B2 * | 6/2006 | Noronha et al. | ............. | 370/537 |
| 7,180,851 B1 * | 2/2007 | Engel et al. | .................... | 370/216 |
| 7,359,964 B2 * | 4/2008 | Roe et al. | ....................... | 709/224 |
| 7,376,159 B1 * | 5/2008 | Stanger et al. | ................ | 370/528 |
| 7,429,983 B2 * | 9/2008 | Islam | ............................. | 345/204 |
| 2001/0043603 A1 * | 11/2001 | Yu | ................................. | 370/393 |
| 2002/0138611 A1 * | 9/2002 | Roe et al. | ....................... | 709/224 |
| 2002/0181044 A1 * | 12/2002 | Kuykendall, Jr. | ............. | 359/124 |
| 2002/0188871 A1 * | 12/2002 | Noehring et al. | ............. | 713/201 |
| 2005/0010409 A1 * | 1/2005 | Hull et al. | ..................... | 704/243 |
| 2005/0060489 A1 * | 3/2005 | Park | ............................. | 711/112 |
| 2007/0276985 A1 * | 11/2007 | Schuessler | .................... | 711/100 |
| 2008/0019247 A1 * | 1/2008 | Nakamura | ................. | 369/53.31 |

FOREIGN PATENT DOCUMENTS

| | | |
|---|---|---|
| EP | 0 252 630 | 1/1988 |
| WO | 03/013004 | 2/2003 |

* cited by examiner

*Primary Examiner* — Chirag Shah
*Assistant Examiner* — Jay P Patel
(74) *Attorney, Agent, or Firm* — Young & Thompson (57) ABSTRACT

The invention relates to transmitting digital information between the network elements of a frame switched data network. In the present invention, it has surprisingly been discovered that the padding bits of the data field of a minimum sized Ethernet frame can be used for transmitting digital information between the elements of a data network. In that case the frame data field (109) of a minimum sized Ethernet frame contains an information unit (DIU), the size of which in bytes is smaller than the minimum size of a frame data field, as well as other digital information (DI) that is written in an area (107) of the frame data field that corresponds to the padding bits. The invention makes it possible to also utilize the data transmission capacity needed for transmitting the padding bits.

26 Claims, 5 Drawing Sheets

TRANSMISSION OF DIGITAL INFORMATION IN A FRAME SWITCHED DATA NETWORK

FIELD OF THE INVENTION

The invention relates to transmitting digital information between the network elements in a frame switched data network. The object of the invention is a method and system for transmitting digital information in a frame switched data network.

BACKGROUND OF THE INVENTION

Digital information transmitted in frame switched data networks is included in chronologically successive, transmittable data frames. The information contained in a data frame can be coarsely divided into overhead data and payload data. Overhead data includes for example a frame start field, i.e. a synchronizing word by which the starting point of a frame in a transmitted bit flow can be detected. Payload data includes data connected to the utilization of services enabled by the data network, as well as data connected to the operation control and management of the data network. Services enabled by a data network are for instance Internet bank services, electronic shopping services, and electronic data search services. Payload data typically represents an information unit or part of an information unit, produced by a protocol of a higher hierarchy level that uses the transmission service offered by the frame switched data transmission protocol. Said frame switched data transmission protocol can be for example an Ethernet protocol, and said information unit can be for example an IP (Internet Protocol) packet. For instance in a data frame according to the Ethernet protocol, the overhead data is represented by an eight-byte preamble, a six-byte destination address, a six-byte source address, a two-byte frame type detector and a four-byte cyclic redundancy check. In the present document, the term "byte" refers to a group of eight bits, i.e. a bit octet. Payload data carried by an Ethernet frame is placed in a frame data field, the size of which is at least 46 bytes. In case said payload data is less than 46 bytes, the rest of the minimum sized frame data field is filled with padding bits. The Ethernet protocol is described for example in the technical specification IEEE802.3 (Institute of Electrical and Electronics Engineers). In order to be able to utilize the transmission capacity of the data network as effectively as possible, the payload data should be arranged in successive data frames, so that the share of overhead data of all data to be transmitted should be as small as possible, i.e. the share of payload data of all data to be transmitted should be as large as possible.

PRIOR ART

In a prior art arrangement, each digital information unit produced by a protocol of a higher hierarchy level is included in one or several data frames allocated for said information unit. In case the higher hierarchy level protocols produce large quantities of small-size information units, there arises a situation where the share required by said small-size information units of the transmission capacity of the data network is fairly large in comparison with the total data quantity represented by said small-size information units. This kind of situation is created for instance when the frame switched data transmission protocol is an Ethernet protocol, and the higher hierarchy level protocol is an SSM synchronizing protocol (Synchronization Status Messaging in synchronous Ethernet). An SSM protocol is described in the recommendation draft G.8261/Y.1361 of the ITU-T (International Telecommunication Union), in appendix VIII.

SUMMARY OF THE INVENTION

The object of the present invention is a system for transmitting digital information in a frame switched data network, so that limitations and drawbacks connected to the prior art can be eliminated or alleviated. Another object of the invention is a method for transmitting digital information in a frame switched data network, so that limitations and drawbacks connected to the prior art can be eliminated or alleviated. Yet another object of the invention is a network element, by which limitations and drawbacks connected to the prior art can be eliminated or alleviated.

In the present invention, it has surprisingly been discovered that the padding bits of a frame data field of a minimum sized Ethernet frame can be used for transmitting digital information between the network elements, such as routers or switches, of a data network. In that case the frame data field of a minimum sized Ethernet frame contains a digital information unit, the size of which in bytes is smaller than the minimum size of a frame data field, and also other digital information that is written in an area of the frame data field corresponding to the padding bits.

By means of the invention, there is achieved a remarkable advantage in that the transmission capacity of the data network can be utilized better than while using the above described prior art arrangement. Now a larger share of the total capacity of the data network is left for utilizing the services enabled by the data network.

A system according to the invention for transmitting digital information from a first network element to a second network element in an Ethernet frame switched data network is characterized in that the system includes:

in said first network element a writing unit that is arranged to define a share corresponding to padding bits in a frame data field of a minimum sized Ethernet frame on the basis of a type of an information unit placed in said frame data field and on the basis of a predetermined rule and to write said digital information into the first portion of the padding bits of the frame data field of the minimum sized Ethernet frame, and in said second network element a reading unit that is arranged to read said digital information from said padding bits, wherein said writing unit is arranged to write flag data into a second portion of the padding bits of said frame data field of said minimum sized Ethernet frame, said flag data being arranged to indicate whether said first portion of the padding bits represent said digital information.

A method according to the invention for transmitting digital information from a first network element to a second network element in an Ethernet frame switched data network is characterized in that in the method:

a share corresponding to padding bits in a frame data field of a minimum sized Ethernet frame is defined in said first network element on the basis of a type of an information unit placed in said frame data field and on the basis of a predetermined rule, said digital information is written in said first network element into a first portion of the padding bits of the frame data field of the minimum sized Ethernet frame, in said first network element, flag data is written into a second portion of the padding bits of said frame data field of said minimum sized Ethernet frame, said flag data being arranged to indicate whether said first portion of the padding bits represent said digital information said minimum sized Ethernet frame is transmitted from said first network element to said second network element, and said digital information is read from said first portion of the padding bits in said second network element.

A network element according to the invention, which can be for example an IP router or an Ethernet switch, is characterized in that the network element includes a writing unit that is arranged to write said digital information into first padding bits of the frame data field of a minimum sized Ethernet frame, the frame data field containing a digital information unit in addition to the padding bits, wherein said writing unit is arranged to write flag data into second padding bits of said frame data field of said minimum sized Ethernet frame, said flag data being arranged to indicate whether said first padding bits represent said digital information.

The various embodiments of the invention are characterized by what is set forth in the dependent claims.

BRIEF DESCRIPTION OF THE DRAWINGS

The invention is described in more detail with reference to the exemplary preferred embodiments and to the appended drawings, where.

DETAILED DESCRIPTION OF THE PREFERRED EMBODIMENTS

Figure 1:
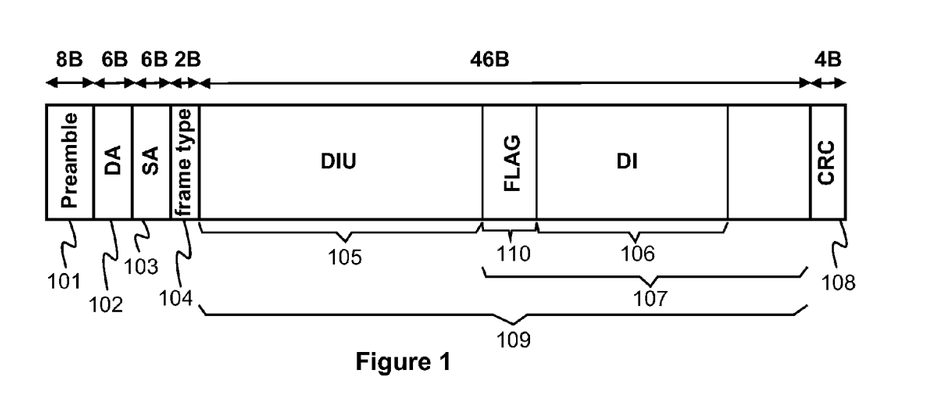
FIG. 1 illustrates how digital information is in an embodiment of the invention placed in the padding bits of the frame data field of a minimum sized Ethernet frame in an exemplary situation.

FIG. 1 illustrates the placing of digital information according to an embodiment of the invention in the padding bits of the frame data field of a minimum sized Ethernet frame in an exemplary situation. The minimum sized Ethernet frame illustrated in FIG. 1 contains a preamble 101, size eight bytes, a destination address 102 (DA), size six bytes, a source address 103 (SA), size six bytes, a frame type detector 104, size two bytes, a frame data field 109, size 46 bytes, and a cyclic redundancy check 108, size four bytes. In FIG. 1, the letter "B" refers to bytes. In the exemplary situation illustrated in FIG. 1, the share 105 of the frame data field 109 contains a digital information unit DIU that can be for example an IP packet. Now the share 107 of the frame data field 109 contains padding bits. The digital information DI is written in the padding bits contained in the share 106 of the frame data field 109. In other words, the values of the padding bits contained in the share 106 are selected so that the padding bits contained in the share 106 represent digital information DI. In this embodiment of the invention, in the padding bits placed in the share 110 of the frame data field 109 there is written flag data that indicates whether the padding bits contained in the share 106 represent the digital information DI. Said flag data can be for instance a predetermined bit vector. In an alternative embodiment of the invention, a situation where the padding bits contained in the share 106 of the frame data field 109 do not represent digital information to be utilized, is indicated by giving predetermined values for the padding bits or part of said padding bits.

In an embodiment of the invention, said flag data contains data that indicates the size of the digital information DI in bytes.

Figure 2:
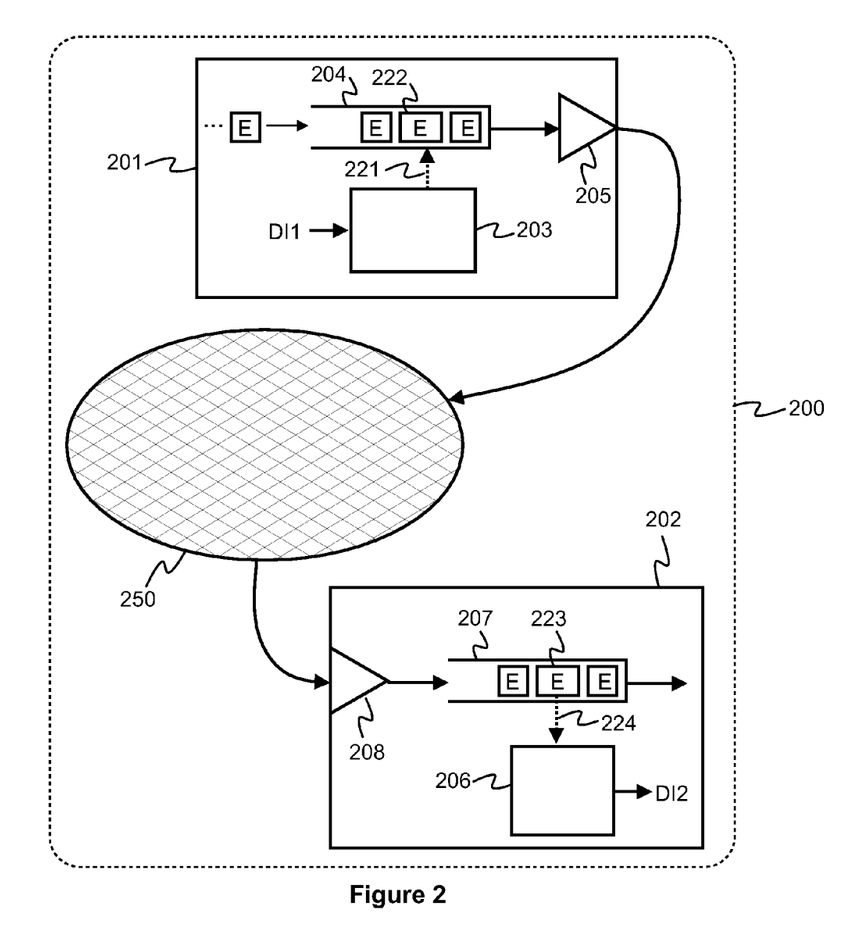
FIG. 2 illustrates a system according to an embodiment of the invention for transmitting digital information between network elements in an Ethernet frame switched data network.

FIG. 2 illustrates a system according to an embodiment of the invention for transmitting digital information from a first network element 201 to a second network element 202 in an Ethernet frame switched data network 200, where the other elements of said network, apart from said network elements 201 and 202, are represented by a cross-hatched ellipse 250. The network element 201 is a writing unit 203 that is arranged to write digital information DI1 in the padding bits of the frame data field of a minimum sized Ethernet frame 222. In this embodiment of the invention, said writing unit 203 is arranged to write digital information DI1 in an Ethernet frame stored in a buffer memory device 204. In other words, the writing unit 203 is arranged to write digital information DI1 in that memory area of said buffer memory device 204 which at the moment of time under observation is storing the padding bits of the frame data field of the Ethernet frame 222. The dotted line arrow 221 represents said writing. The network element 201 is a transmission unit 205 that is arranged to read Ethernet frames from buffer memory devices 204 and to transmit the read Ethernet frames to a data network element 250.

The network element 202 includes a reading unit 206 that is arranged to read digital information DI2 from the padding bits of the frame data field of the minimum sized Ethernet frame 223. In this embodiment of the invention, said reading unit 206 is arranged to read digital information DI2 from an Ethernet frame stored in the buffer memory device 207. In other words, the reading unit 206 is arranged to read digital information DI2 from that memory area of said buffer memory device 207 which at the moment of time under observation is storing the padding bits of the frame data field of the Ethernet frame 223. The dotted line arrow 224 represents said reading. The network element 202 includes a reception unit 208 that is arranged to receive Ethernet frames from the data network element 250 and to write the received Ethernet frames in the buffer memory device 207.

For controlling the Ethernet frames stored in the buffer memory devices 204 and 207, as well as for defining the memory areas to be written and read, there can be used methods and data structures, for example linked lists, that are known as such for men skilled in the art.

In a system according to an embodiment of the invention, the digital information DI1 represents time stamp information that indicates the transmission moment of the minimum sized Ethernet frame 222 from the network element 201. An estimate for said transmission moment can be defined on the basis of the prevailing moment of time, the transmission rate (bits per second) of the transmission unit 205 and on the basis of the quantity of the digital data contained in the buffer memory device 204 that must be transmitted prior to transmitting the Ethernet frame 222.

In a system according to an embodiment of the invention, the digital information DI1 represents the operation control information of an Ethernet frame switched data network 200.

In a system according to an embodiment of the invention, the digital information DI1 represents the management information of an Ethernet frame switched data network 200.

The digital information transmitted in padding bits need not represent any of the above enlisted information types, but the above mentioned information types are examples only. In addition to the above mentioned examples, said digital information can represent for instance a random number or some other data to be transmitted from a network element to another network element.

In a system according to an embodiment of the invention, the writing unit 203 is arranged to define the share represented by the padding bits in the frame data field of the Ethernet frame 222 on the basis of the contents of the information unit placed in said frame data field. Said information unit placed in the frame data field can be for example an IP (Internet Protocol) packet that contains data indicating the size of said IP packet.

In a system according to an embodiment of the invention, the writing unit 203 is arranged to define the share represented by the padding bits in the frame data field of the Ethernet frame 222 on the basis of the type of the information unit placed in said frame data field, as well as on the basis of a predetermined rule. The information unit placed in said frame data field can be for example an SSM message, and said predetermined rule can represent a known size of the SSM message (Synchronization Status Messaging in synchronous Ethernet).

In a system according to an embodiment of the invention, the writing unit 203 is arranged to divide the digital information entity that must be transmitted in the network element 202 into at least two parts, each of said parts representing digital information to be written in the padding bits of the frame data field of one minimum sized Ethernet frame. Respectively, the reading unit 206 is arranged to compile the digital information entity of at least two parts, each of said parts representing digital information read from the padding bits of the frame data field of one minimum sized Ethernet frame.

Figure 3:
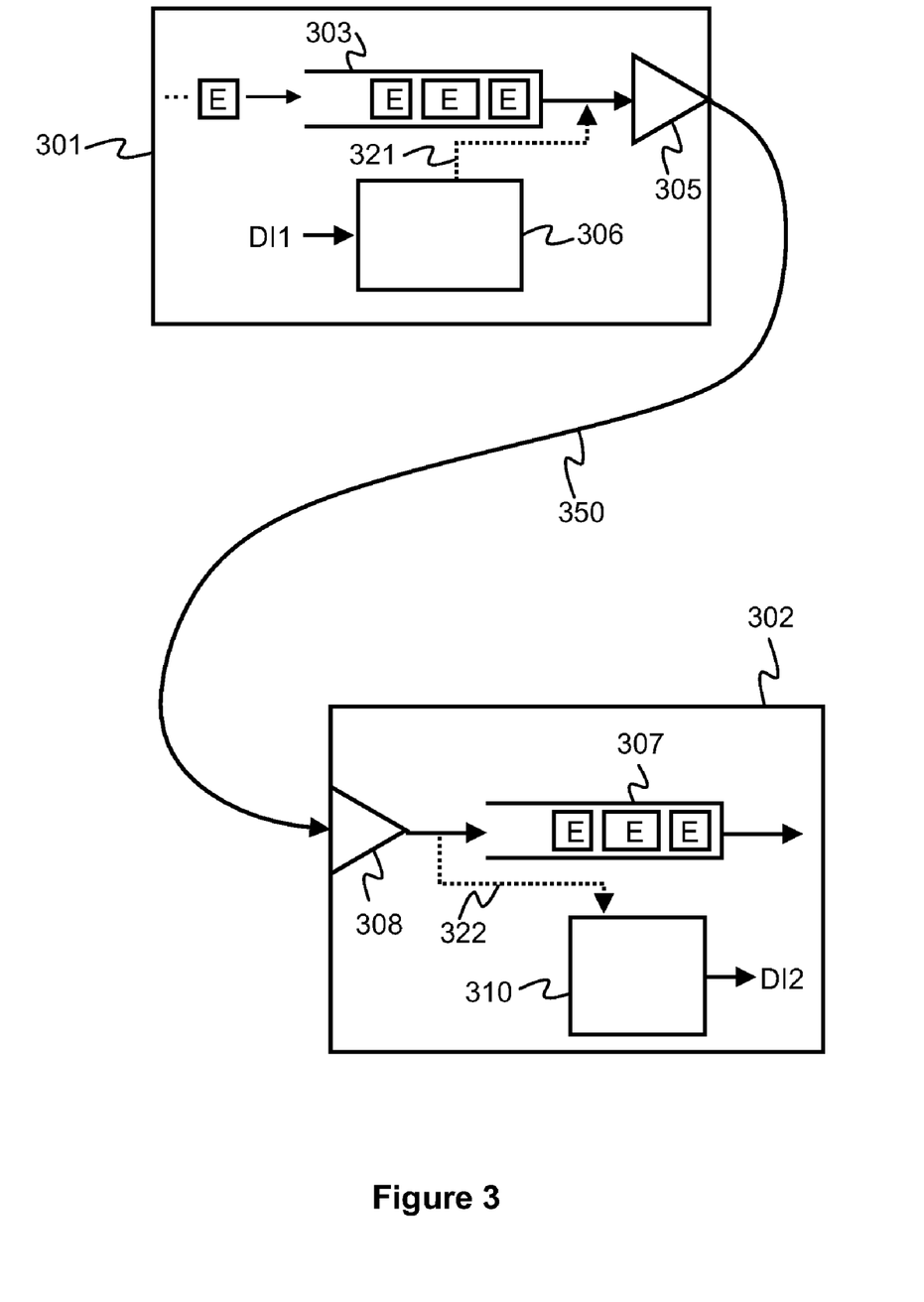
FIG. 3 illustrates a system according to an embodiment of the invention for transmitting digital information between network elements in an Ethernet frame switched data network.

FIG. 3 illustrates a system according to an embodiment of the invention for transmitting digital information from a first network element 301 to a second network element 302. The network element 301 is a writing unit 306 that is arranged to write the digital information DI1 in the padding bits of the frame data field of a minimum sized Ethernet frame E during the transmission of said minimum sized Ethernet frame. In other words, the writing unit is arranged to write the digital information DI1 in said padding bits while said minimum sized Ethernet frame is being transmitted to a data transmission link 350. The setting of the value of a single padding bit in a value defined by the digital information DI1 can be carried out for instance when said padding bit has just been read from the transmission buffer 303. The dotted line arrow 321 represents said writing.

The network element 302 includes a reading unit 310 that is arranged to read the digital information DI2 from the padding bits of the frame data field of a minimum sized Ethernet frame E during the reception of said minimum sized Ethernet frame. In other words, the reading unit is arranged to read the digital information DI2 from said padding bits while said minimum sized Ethernet frame is being received from the data transmission link 350. The reading of the value of a single padding bit can be carried out for instance when said padding bit is being written in the reception buffer 307. The dotted line arrow 322 represents said reading.

The embodiment illustrated in FIG. 3 is advantageous particularly when the transmission time of the digital information DI1 from the network element 301 to the network element 302 must be as short as possible, and/or when the fluctuation of said transmission time between separate transmissions must be as slight as possible. This kind of situation is at hand for example when the digital information DI1 represents the timing information that is used for synchronizing the operations of the network elements 301 and 302.

Figure 4:
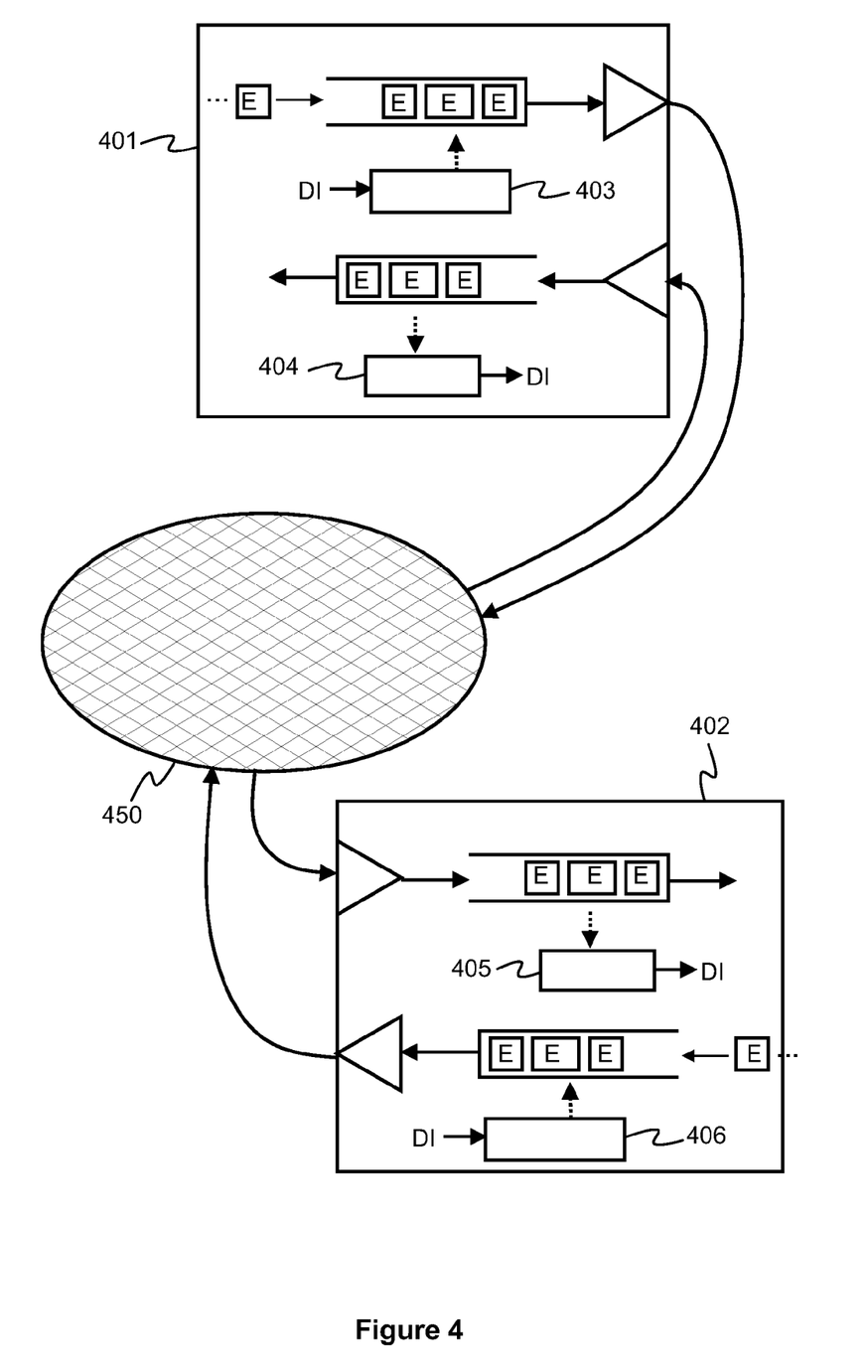
FIG. 4 illustrates a system according to an embodiment of the invention for transmitting digital information between network elements in an Ethernet frame switched data network.

FIG. 4 illustrates a system according to an embodiment of the invention for transmitting digital information between the network elements 401 and 402 in an Ethernet frame switched data network. The system illustrated in FIG. 4 enables a two-directional transmission of digital information between the network elements 401 and 402. Other parts of the data network, apart from said network elements 401 and 402, are represented by a cross-hatched ellipse 450.

The network element 401 includes a writing unit 403 that is arranged to write digital information in the padding bits of the frame data field of a minimum sized Ethernet frame E. The network element 401 includes a reading unit 404 that is arranged to read digital information from the padding bits of the frame data field of another minimum sized Ethernet frame E.

The network element 402 is a writing unit 406 that is arranged to write digital information in the padding bits of the frame data field of a minimum sized Ethernet frame E. The network element 402 is a reading unit 405 that is arranged to read digital information from the padding bits of the frame data field of another minimum sized Ethernet frame E.

Figure 5:
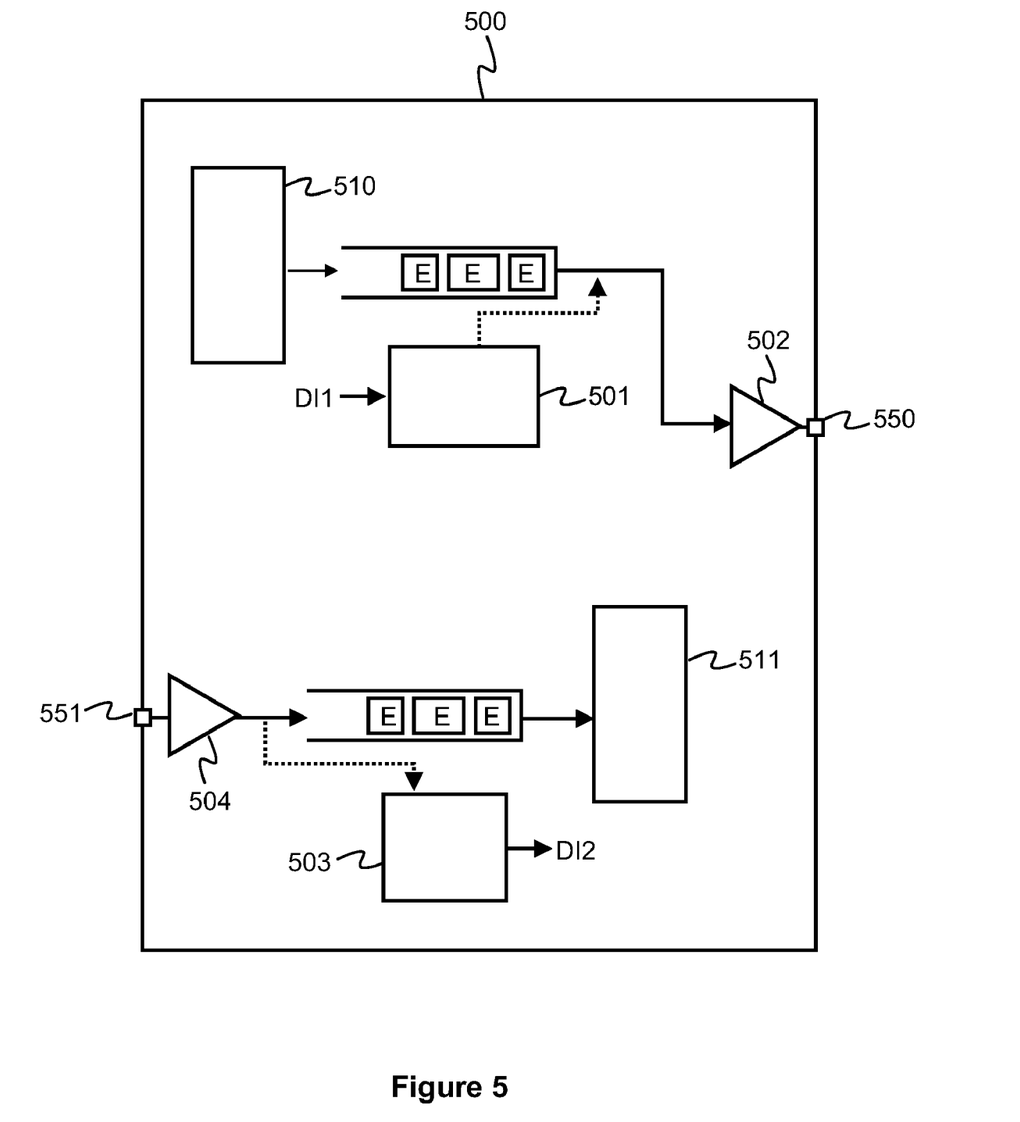
FIG. 5 illustrates a network element according to an embodiment of the invention.

FIG. 5 illustrates a network element 500 according to an embodiment of the invention. The network element includes a writing unit 501 that is arranged to write the digital information DI1 to be transmitted in the padding bits of the frame data field of a first minimum sized Ethernet frame E. The network element includes a transmission unit 502 that is arranged to transmit Ethernet frames E in the transmission port 550.

A network element according to an embodiment of the invention includes a reading unit 503 that is arranged to read the received digital information DI2 from the padding bits of the frame data field of a second minimum sized Ethernet frame E. The network element includes a reception unit 504 that is arranged to receive Ethernet frames E from the reception port 551.

In a network element according to an embodiment of the invention, the writing unit 501 is arranged to write the digital information DI1 to be transmitted in the padding bits of the frame data field of said first minimum sized Ethernet frame during the transmission of said first minimum sized Ethernet frame.

In a network element according to an embodiment of the invention, the reading unit 503 is arranged to read the received digital information DI2 from the padding bits of the frame data field of said second minimum sized Ethernet frame during the reception of said second minimum sized Ethernet frame.

In a network element according to an embodiment of the invention, the digital information DI1 to be transmitted represents time stamp information that indicates the transmission moment of said first minimum sized Ethernet frame.

The network element illustrated in FIG. 5 can be for example an IP router or an Ethernet switch, and it can serve for instance as a base station in a mobile phone network.

The blocks 510 and 511 illustrated in FIG. 5 represent such elements of the network element that are not significant with respect to the present invention.

Figure 6:
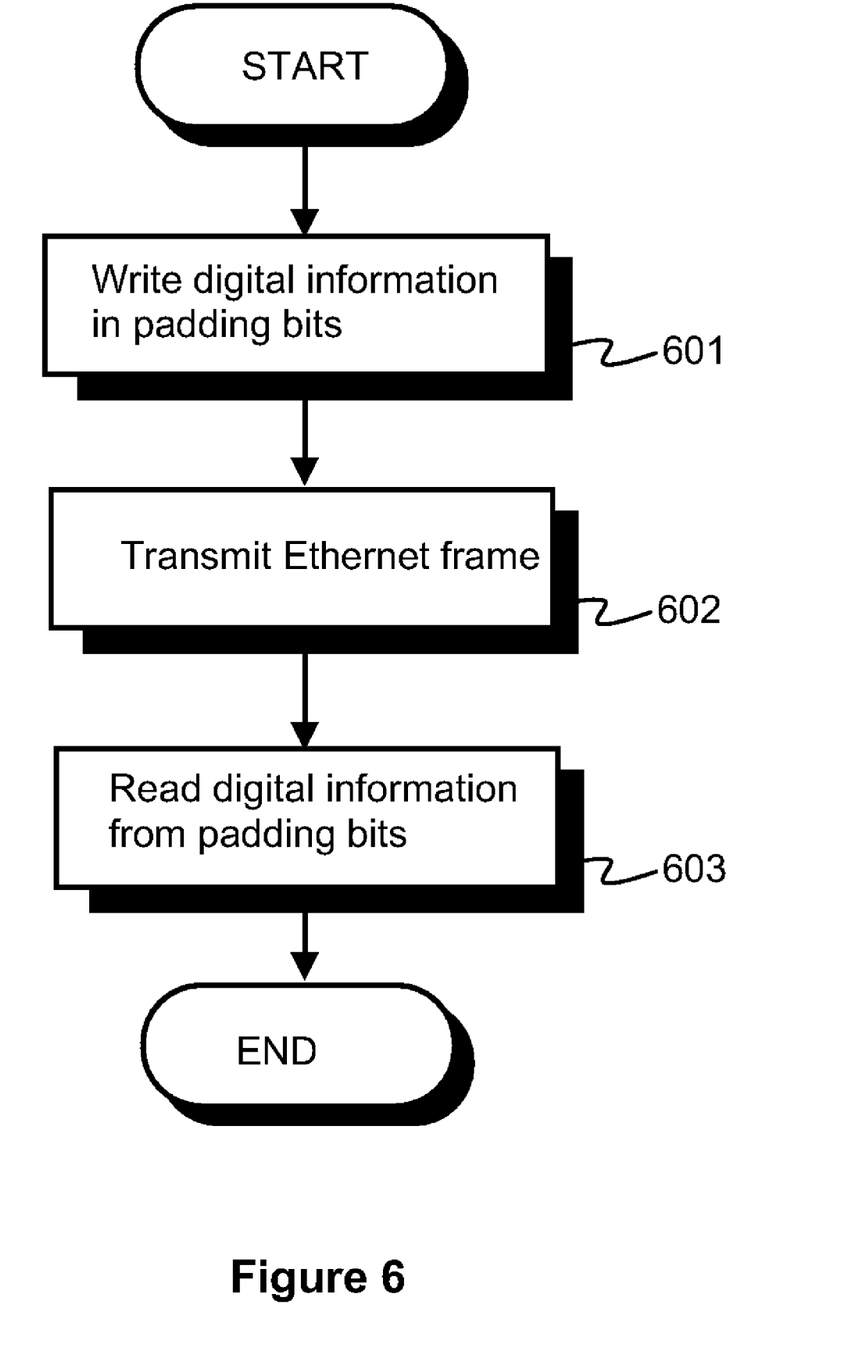
FIG. 6 is a flowchart illustrating a method according to an embodiment of the invention for transmitting digital information from a first network element to a second network element in an Ethernet frame switched data network.

FIG. 6 is a flowchart illustrating a method according to an embodiment of the invention for transmitting digital information from a first network element to a second network element in an Ethernet frame switched data network. In step 601, said digital information is written in said first network element in the padding bits of the frame data field of a minimum sized Ethernet frame. In step 602, said minimum sized Ethernet frame is transmitted from said first network element to said second network element. In step 603, said digital information is read from said padding bits in said second network element.

In a method according to an embodiment of the invention, said digital information is written in said padding bits while the minimum sized Ethernet frame is being transmitted from said first network element, and said digital information is read from said padding bits while the minimum sized Ethernet frame is being received in said second network element.

In a method according to an embodiment of the invention, said digital information represents time stamp information that indicates the transmission moment of said minimum sized Ethernet frame from said first network element.

In a method according to an embodiment of the invention, said digital information represents the operation control information of said Ethernet frame switched data network.

In a method according to an embodiment of the invention, said digital information represents the management information of said Ethernet frame switched data network.

In a method according to an embodiment of the invention, the share of the frame data field corresponding to said padding bits is defined on the basis of the contents of the information unit placed in said frame data field. The information unit placed in said frame data field can be for example an IP packet that contains data indicating the size of said IP packet.

In a method according to an embodiment of the invention, the share of the frame data field corresponding to said padding bits is defined on the basis of the type of the information unit placed in the frame data field, and on the basis of a predetermined rule. The information unit placed in said frame data field can be for example an SSM message, and said predetermined rule can be for example information of the size of the SSM message (Synchronization Status Messaging in synchronous Ethernet).

In a method according to an embodiment of the invention, the digital information entity is in said first network element divided into at least two parts, each of said parts representing digital information to be written in the padding bits of the frame data field of one minimum sized Ethernet frame. Respectively, said digital information entity is compiled in said second network element of at least two parts, each of said parts representing the digital information read from the padding bits of the frame data field of one minimum sized Ethernet frame. In other words, the digital information entity can be transmitted from the first network element to the second network element by using the padding bits of the frame data fields of several minimum sized Ethernet frames.

As is obvious for a man skilled in the art, the invention and its various embodiments are not restricted to the above described exemplary embodiments, but the invention and its embodiments can be modified within the scope of the independent claim.

The invention claimed is:

1. A system for transmitting digital information from a first network element to a second network element in an Ethernet frame switched data network, the system including:

in said first network element a writing unit that defines which bits of a frame data field of a minimum sized Ethernet frame correspond to padding bits in a frame data field of said minimum sized Ethernet frame on the basis of a type of an information unit placed in said frame data field and on the basis of a predetermined rule and to write said digital information into a first portion of the padding bits, and in said second network element a reading unit that reads said digital information from said padding bits, wherein said writing unit writes flag data into a second portion of the padding bits of said frame data field of said minimum sized Ethernet frame, said flag data indicates whether said first portion of the padding bits represent said digital information.

2. The system according to claim 1, wherein said writing unit writes said digital information in said first portion of the padding bits during transmission of said minimum sized Ethernet frame from said first network element, and said reading unit reads said digital information from said first portion of the padding bits during reception of said minimum sized Ethernet frame in said second network element.

3. The system according to claim 2, wherein said digital information represents time stamp information that indicates a transmission moment of said minimum sized Ethernet frame from said first network element.

4. The system according to claim 1, wherein said digital information represents time stamp information that indicates a transmission moment of said minimum sized Ethernet frame from said first network element.

5. The system according to claim 1, wherein said digital information represents operation control information of said Ethernet frame switched data network.

6. The system according to claim 1, wherein said digital information represents management information of said Ethernet frame switched data network.

7. The system according to claim 1, wherein the information unit located in said frame data field is an IP-packet that contains data indicating the size of said IP-packet (Internet Protocol).

8. The system according to claim 1, wherein said information unit placed in the frame data field is an SSM-message, and that said predetermined rule is represented by a known size of the SSM-message (Synchronization Status Messaging in synchronous Ethernet).

9. The system according to claim 1, wherein said writing unit divides a digital information entity into at least two parts, each of said parts representing the digital information to be written into the first portion of the padding bits of a frame data field of one minimum sized Ethernet frame.

10. The system according to claim 9, wherein said reading unit compiles said digital information entity of at least two parts, each of said parts representing the digital information read from the first portion of the padding bits of a frame data field of one minimum sized Ethernet frame.

11. A network element, comprising:

a writing unit, wherein said writing unit defines which bits of a frame data field of a first minimum sized Ethernet Frame correspond to padding bits in the frame data field of the first minimum sized Ethernet frame on the basis of a type of an information unit placed in said frame data field and on the basis of a predetermined rule, writes digital information to be transmitted into a first portion of the padding bits of the frame data field of the first minimum sized Ethernet frame, and writes flag data into a second portion of the padding bits of said frame data field of said first minimum sized Ethernet frame, said flag data being indicates whether said first portion of the padding bits represent said digital information, wherein the network element further comprises a reading unit that reads received digital information from a first portion of padding bits of a frame data field of a second minimum sized Ethernet frame during reception of the second minimum sized Ethernet frame in said network element.

12. The network element according to claim 11, wherein said writing unit writes said digital information to be transmitted in the first portion of the padding bits of the frame data field of said first minimum sized Ethernet frame during transmission of said first minimum sized Ethernet frame from said network element.

13. The network element according to claim 12, wherein said digital information to be transmitted represents time stamp information that indicates a transmission moment of said first minimum sized Ethernet frame from said network element.

14. The network element according to claim 11, wherein the network element is an IP router (Internet Protocol).

15. The network element according to claim 11, wherein the network element is an Ethernet switch.

16. The network element according to claim 11, wherein the network element is a mobile phone network base station.

17. A method for transmitting digital information from a first network element to a second network element in an Ethernet frame switched data network, the method comprising:

in said first network element, defining which bits of a frame data field of a minimum sized Ethernet frame correspond to padding bits in a frame data field of said minimum sized Ethernet frame on the basis of a type of an information unit placed in said frame data field and on the basis of a predetermined rule, in said first network element, writing said digital information into a first portion of the padding bits of the frame data field of the minimum sized Ethernet frame, the frame data field containing a digital information unit in addition to the padding bits in said first network element, writing flag data into a second portion of the padding bits of said frame data field of said minimum sized Ethernet frame, said flag data indicates whether said first portion of the padding bits represent said digital information, transmitting said minimum sized Ethernet frame from said first network element to said second network element, and reading said digital information from said first portion of the padding bits in said second network element.

18. The method according to claim 17, wherein said digital information is written in said first portion of the padding bits during transmission of said minimum sized Ethernet frame from said first network element, and that said digital information is read from said first portion of the padding bits during reception of said minimum sized Ethernet frame in said second network element.

19. The method according to claim 18, wherein said digital information represents time stamp information that indicates a transmission moment of said minimum sized Ethernet frame from said first network element.

20. The method according to claim 17, wherein said digital information represents time stamp information that indicates a transmission moment of said minimum sized Ethernet frame from said first network element.

21. The method according to claim 17, wherein said digital information represents operation control information of said Ethernet frame switched data network.

22. The method according to claim 17, wherein digital information represents management information of said Ethernet frame switched data network.

23. The method according to claim 17, wherein said information unit placed in the frame data field is an IP-packet that contains data indicating the size of said IP-packet (Internet Protocol).

24. The method according to claim 17, wherein the information unit placed in the frame data field is an SSM-message, and that the applied predetermined rule is data indicating a size of the SSM-message (Synchronization Status Messaging in synchronous Ethernet).

25. The method according to claim 17, wherein a digital information entity is divided in said first network element into at least two parts, each of said parts representing digital information to be written into the first portion of the padding bits of a frame data field of one minimum sized Ethernet frame.

26. The method according to claim 25, wherein said digital information entity is compiled in said second network element of at least two parts, each of said parts representing digital information read from the first portion of padding bits of a frame data field of one minimum sized Ethernet frame.

* * * * *